US012109696B2

(12) United States Patent
Ida

(10) Patent No.: US 12,109,696 B2
(45) Date of Patent: Oct. 8, 2024

(54) STOPPER STRUCTURE AND ARTICULATED ROBOT

(71) Applicant: NACHI-FUJIKOSHI CORP., Tokyo (JP)

(72) Inventor: Shinya Ida, Toyama (JP)

(73) Assignee: NACHI-FUJIKOSHI CORP., Tokyo (JP)

( * ) Notice: Subject to any disclaimer, the term of this patent is extended or adjusted under 35 U.S.C. 154(b) by 0 days.

(21) Appl. No.: 18/183,684

(22) Filed: Mar. 14, 2023

(65) Prior Publication Data

US 2023/0294273 A1 Sep. 21, 2023

(30) Foreign Application Priority Data

Mar. 15, 2022 (JP) .................... 2022-039899

(51) Int. Cl.
*B25J 9/10* (2006.01)
*B25J 19/00* (2006.01)

(52) U.S. Cl.
CPC ........... *B25J 9/101* (2013.01); *B25J 19/0091* (2013.01); *Y10T 74/20329* (2015.01)

(58) Field of Classification Search
CPC ......... B25J 9/101; B25J 19/0091; G05G 5/04; Y10T 74/20329; Y10T 74/20305; Y10T 74/2063
USPC ....................................... 192/139, 148, 149
See application file for complete search history.

(56) References Cited

U.S. PATENT DOCUMENTS

| 4,606,667 | A | * | 8/1986 | Bailey | ................. B25J 19/0091 901/17 |
| 2007/0089963 | A1 | * | 4/2007 | Kinoshita | ............... B25J 9/101 29/407.01 |
| 2022/0184798 | A1 | * | 6/2022 | Norboe | ............... B25J 19/0091 |

FOREIGN PATENT DOCUMENTS

JP        2007-118114 A    5/2007

\* cited by examiner

*Primary Examiner* — Richard M Lorence
(74) *Attorney, Agent, or Firm* — Stein IP LLC

(57) ABSTRACT

It is an object of the present invention to provide a stopper structure that can be arranged even at a position where no sufficient space can be ensured, such as at an axis at which an arm has a large operation range, and can appropriately absorb a shear load, and an articulated robot including such a stopper structure. A stopper structure according to the present invention relates to a stopper structure 100a for restricting relative rotation between an arm 120 and a mechanical element (base 110) by a predetermined angle or more, the stopper structure including: a protrusion 122 provided on one of the arm and the mechanical element; a hole 116 formed in the other one of the arm and the mechanical element; and a stopper 140 inserted into the hole while being partially exposed from the hole, wherein the stopper including: a block 150 made of an elastic resin; and a metal surface plate 160 that has a bent cross-section, and is provided on a surface of the block along a front side on which the stopper comes into contact with the protrusion.

6 Claims, 5 Drawing Sheets

STOPPER STRUCTURE AND ARTICULATED ROBOT

CROSS-REFERENCE TO RELATED APPLICATIONS

This application is based upon and claims the benefit of priority from the prior Japanese Patent Application No. 2022-039899, filed on Mar. 15, 2022, the entire contents of which are incorporated herein by reference.

BACKGROUND OF THE INVENTION

Field of the Invention

The present invention relates to a stopper structure for restricting relative rotation between an arm and a mechanical element by a predetermined angle or more, and an articulated robot including such a stopper structure.

Description of the Related Art

Production sites such as factories employ industrial robots (hereinafter, referred to as "articulated robots") such as robot arms (also referred to as "manipulators"). Among various articulated robots, particularly articulated robots for use in processing workpieces have an arm that is fixed to a base, or a plurality of arms coupled to each other at a joint (movable part), and such articulated robots move their arm or arms to perform processing such as picking and working on the workpieces.

For example, JP 2007-118114A discloses "a robot stop device including a stopper member that is provided at least one of a pair of relative movement parts, which move relative to each other, and is configured to be interposed between the pair of relative movement parts to stop the relative movement in case of a collision thereof". Specifically, the stopper member of the robot stop device according to JP 2007-118114A is a "combined member that is obtained by bonding at least two types of members having different degrees of hardness to each other, and is combined in such a manner that two end faces of the member having the higher degree of hardness are in direct contact with the pair of relative movement parts, and receive a compressive load in case of a collision of the pair of relative movement parts, substantially perpendicularly".

SUMMARY OF THE INVENTION

In recent years, an increase in speed of operation of articulated robots has led to an increase in impact energy (load) that is generated when an arm comes into contact with a base, or when arms come into contact with each other. Even if a user tries to use a rubber stopper made of an elastic body such as urethane to absorb the energy, it is difficult to ensure a space with a thickness and a width required in the direction of a compressive load at, for example, an axis of an articulated robot such as a J1 axis at which the arm has a large operation range, namely, an operating angle exceeding 340 degrees. Also, even if such an elastic body is arranged in a limited space, the elastic body alone cannot receive shear loads due to dynamic loads, and does not function as a stopper.

That is to say, for an axis such as a J1 axis at which the arm has a large operation range, it was difficult to realize a stopper structure that takes advantage of the absorption impact of an elastic body. Also, when the robot is in an orientation such as a forward tilting orientation in which it has a large inertia and a motion energy is increased, the robot needs to decelerate to protect structural members such as a stopper member or an arm.

Also, although the stopper member disclosed in JP 2007-118114A can absorb compressive loads, it cannot absorb other loads such as shear loads. According to JP 2007-118114A, the stopper member is provided on each of two sides of the base. However, if there is no sufficient space for arranging such stopper members at an axis at which the arm has a large operation range, it may be difficult to arrange the stopper members adjacent to the base in a manner as described in JP 2007-118114A.

In view of the above-described problems, it is an object of the present invention to provide a stopper structure that can be arranged even at a position where no sufficient space can be ensured, such as at an axis at which an arm has a large operation range, and can appropriately absorb a shear load, and an articulated robot including such a stopper structure.

In order to solve the foregoing problems, a representative configuration of a stopper structure according to the present invention relates to a stopper structure for restricting relative rotation between an arm and a mechanical element by a predetermined angle or more, the stopper structure including: a protrusion provided on one of the arm and the mechanical element; a hole formed in the other one of the arm and the mechanical element; and a stopper inserted into the hole while being partially exposed from the hole, wherein the stopper includes: a block made of an elastic resin; and a metal surface plate that has a bent cross-section, and is provided on a surface of the block along a front side on which the stopper comes into contact with the protrusion.

Preferably, the block may be a polygonal prism. Also, the mechanical element may preferably be a base or another arm of an articulated robot.

Preferably, the stopper structure may further include a retaining plate that biases the stopper to prevent the stopper from being removed from the hole.

In order to solve the foregoing problems, a representative configuration of an articulated robot according to the present invention relates to an articulated robot including the above-described stopper structure.

According to the present invention, it is possible to provide a stopper structure that can be arranged even at a position where no sufficient space can be ensured, such as at an axis at which an arm has a large operation range, and can appropriately absorb a shear load, and an articulated robot including such a stopper structure.

DETAILED DESCRIPTION OF THE INVENTION

Figure 1:
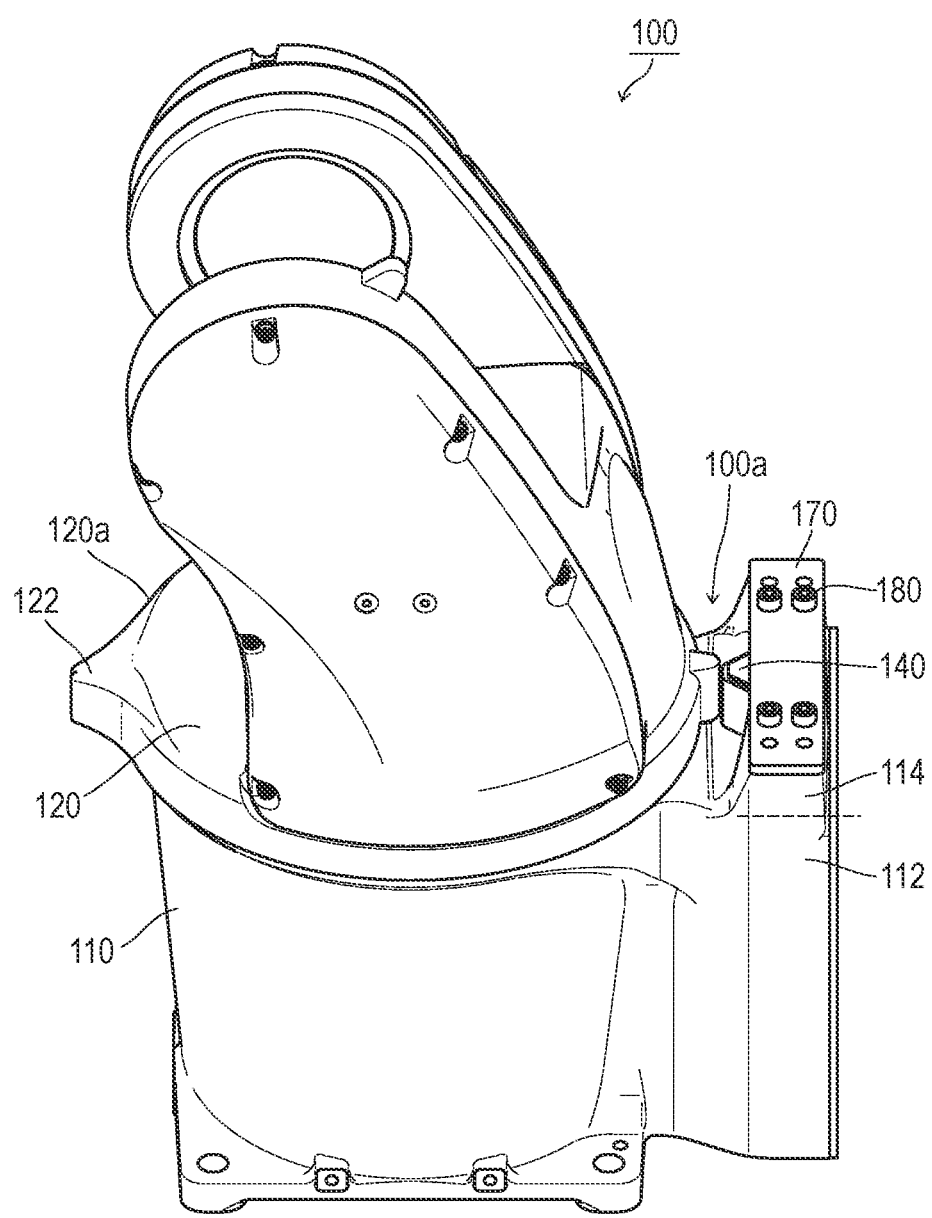
FIG. 1 is a perspective view illustrating a J1 shaft of an articulated robot provided with a stopper structure according to an embodiment.

Referring to the accompanying drawings, the following is a detailed explanation of preferred embodiments of the present invention. All dimensions, materials and further specific numbers shown in the embodiment are merely given as examples in order to aid the understanding of the invention, and are not meant to limit the present invention, unless otherwise stated. It should be further noted that throughout this specification and in the drawings, elements that have substantially the same functionality and/or structure are denoted by the same reference numerals and are not described redundantly. Furthermore, elements that are not directly related to the present invention may not necessarily be shown in the figures.

The present embodiment will describe an example in which the stopper structure according to the present invention is applied to a J1 axis of an articulated robot. That is to say, the stopper structure shown in FIGS. 1 to 5 is a stopper structure for restricting relative rotation between an arm (mechanical element) and a base (mechanical element) by a predetermined angle or more at a J1 axis of an articulated robot. The stopper structure includes: a protrusion provided on the arm; a hole formed in the base; and a stopper inserted into the hole while being partially exposed from the hole. The stopper includes: a block made of an elastic resin; and a metal surface plate that has a bent cross-section, and is provided on a surface of the block along a front side on which the stopper comes into contact with the protrusion.

Figure 2:
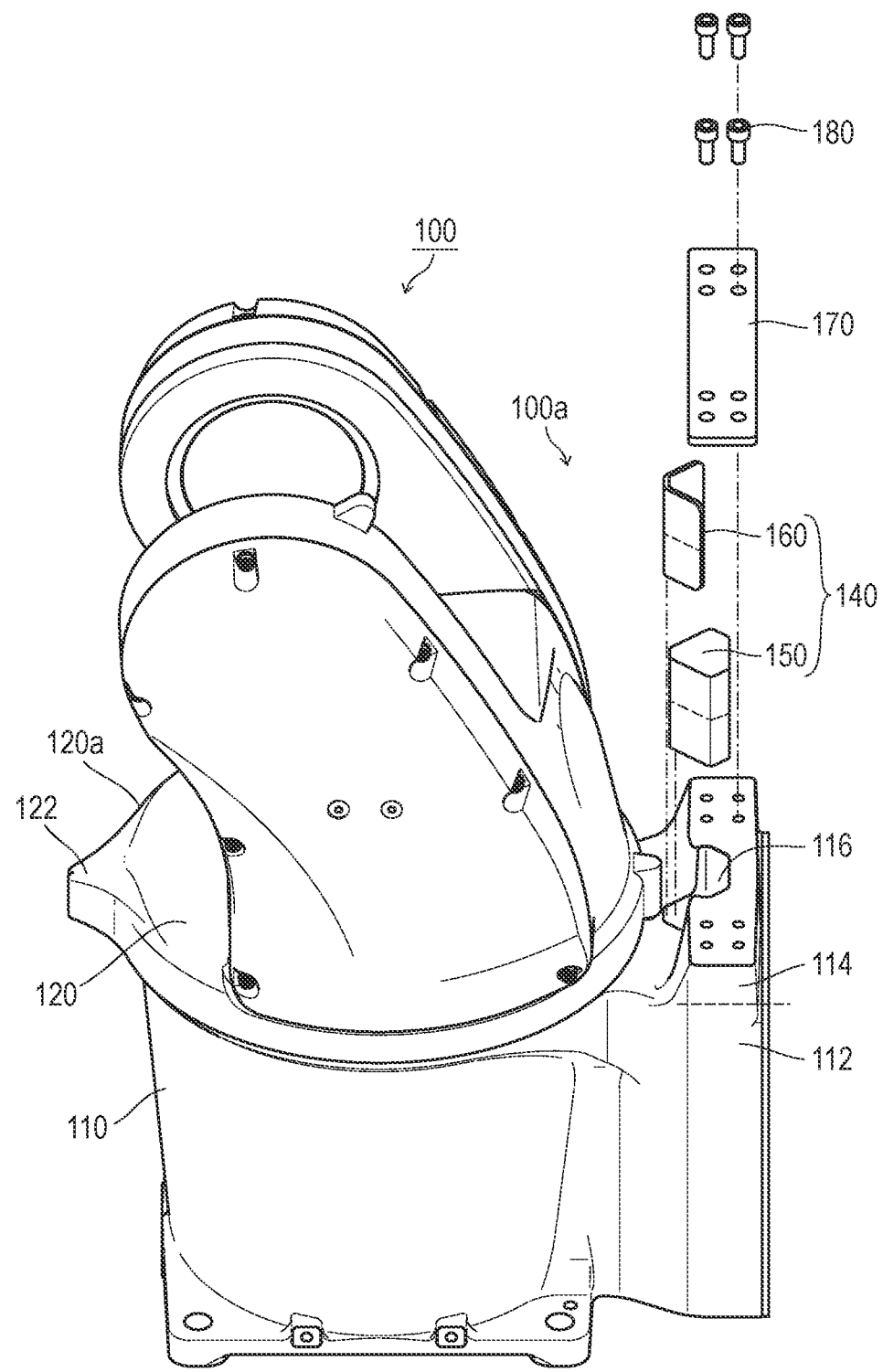
FIG. 2 is a diagram illustrating the stopper structure of FIG. 1 in an exploded view.

FIG. 1 is a perspective view illustrating a J1 axis of an articulated robot (hereinafter, referred to as "robot 100") with a stopper structure 100a according to the present embodiment. FIG. 2 is a diagram illustrating the stopper structure 100a of FIG. 1 in an exploded state. The robot 100 is an articulated robot such as a 5-axis or 6-axis articulated robot, but descriptions of the J2 axis onwards are not essential for the description of the invention and thus are omitted. In the following embodiment, a description of the stopper structure 100a of the present embodiment will be given together with a detailed description of the robot 100 with reference to the drawings at the same time.

Note that in the present embodiment, a base 110 is exemplified as a mechanical element, but the present invention is not limited to this, and the stopper structure according to the present invention may also be applied to another joint of the articulated robot such as the J2, . . . , J5, or J6 axis. In this case, preferably, a stopper may be provided on one of the arms at the corresponding joint, and a hole into which the stopper is inserted may be formed in the other arm (mechanical element). Also in the present embodiment, an example is given in which a protrusion is provided on an arm 120, and a stopper is provided on the base 110, but by contraries, a protrusion may be provided on the base 110 and the stopper may be provided on the arm 120.

As shown in FIGS. 1 and 2, the robot of the present embodiment includes the base 110 (mechanical element) and the arm 120. The base 110 is a member for fixing the robot 100 of the present embodiment to a seating or the like (not shown). The arm 120 is pivotally supported on the base 110 and rotates with respect to the base 110.

Figure 3A:
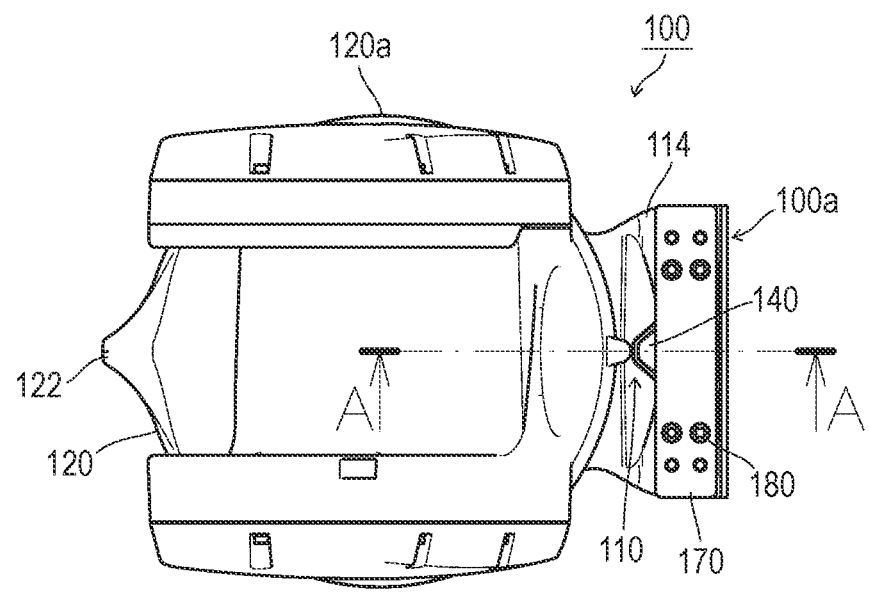
FIG. 3A and FIG. 3B illustrate the articulated robot of FIG. 1 in a top view (FIG. 3A) and a side view (FIG. 3B).
Figure 3B:
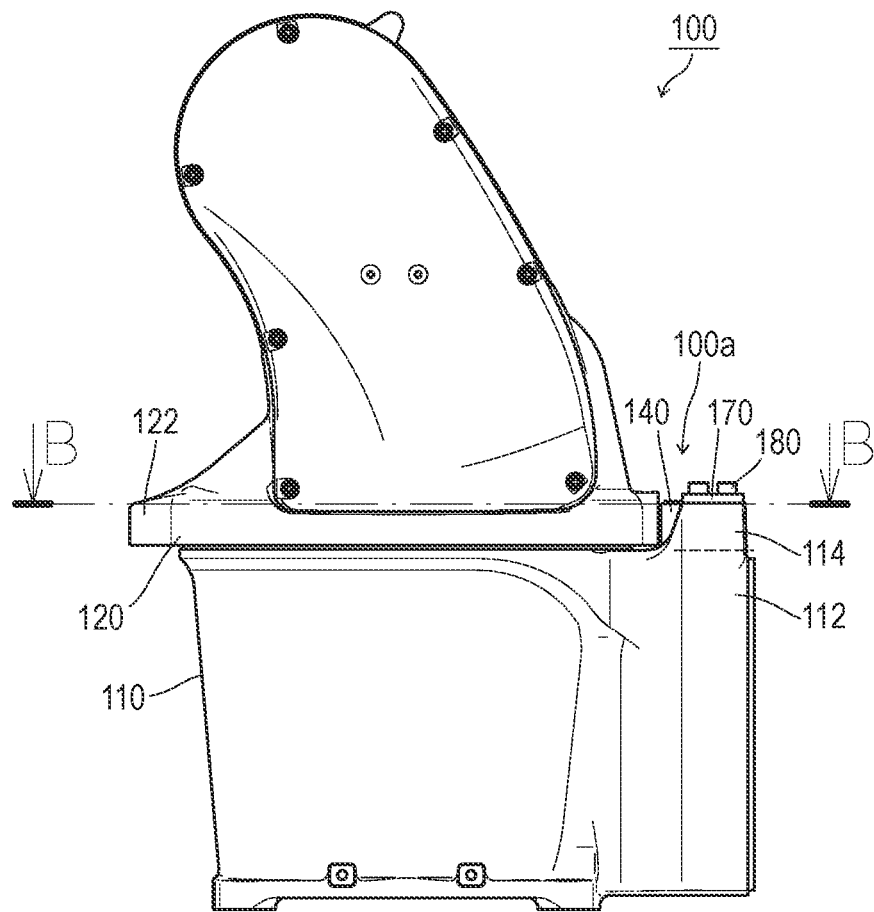
Figure 4:
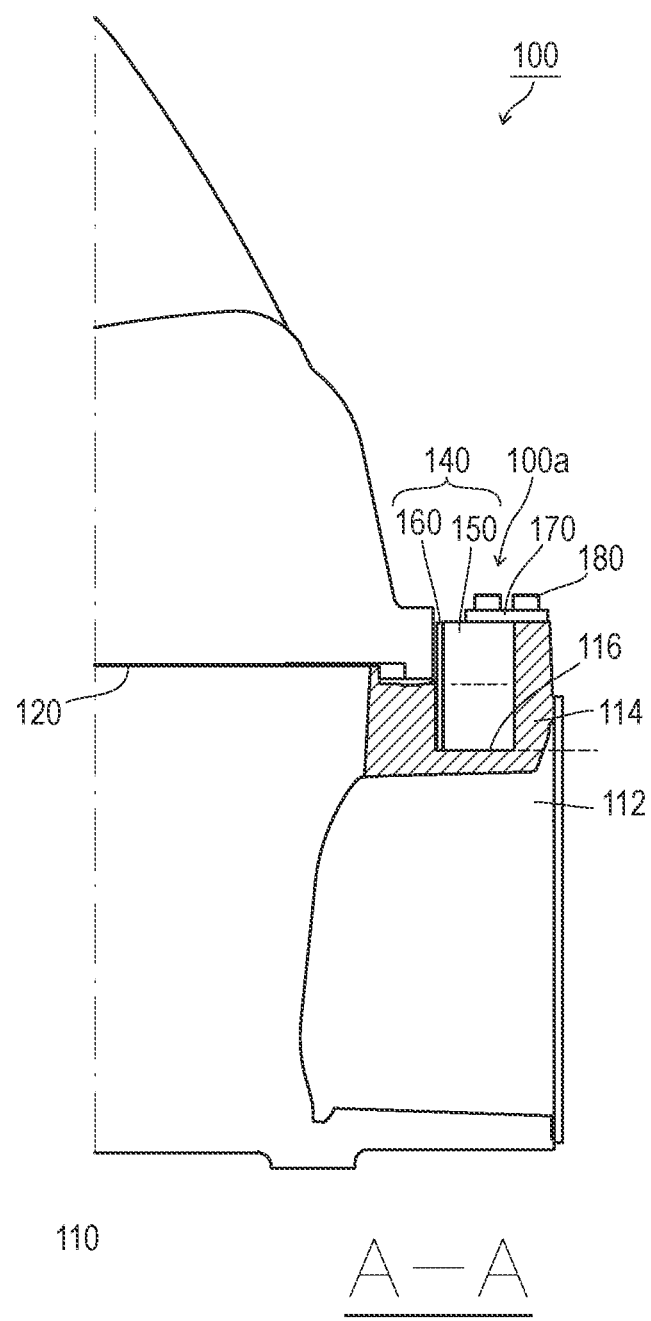
FIG. 4 is a cross-sectional view taken along line A-A in FIG. 3A.

FIGS. 3A and 3B respectively illustrate the robot 100 of FIG. 1 in a top view and a side view. FIG. 3A is a top view of the robot 100 shown in FIG. 2. FIG. 3B is a side view of the robot 100 shown in FIG. 2. FIG. 4 is a cross-sectional view taken along the line A-A in FIG. 3A.

As shown in FIGS. 3A, 3B, and 4, the robot 100 of the present embodiment includes the stopper structure 100a for restricting the arm 120 from "rotating by a predetermined angle (e.g., 170 degrees, see FIGS. 5A and 5B) or more" with respect to the base 110. The stopper structure 100a of the present embodiment includes a protrusion 122 formed on the arm 120, a hole 116 formed in the base 110, which is a mechanical element, and a stopper 140 that is inserted into the hole 116 while being partially exposed from the hole 116.

The protrusion 122 protrudes from an outer circumference 120a of the arm 120 outward in a radial direction. FIGS. 1 to 3B show a state in which the protrusion 122 is in a default position (located opposite to the stopper 140).

The base 110 includes a body portion 112, and an attaching portion 114 that protrudes upward from the body portion 112 (in a direction toward the protrusion 122). Note that in the present embodiment, a case is exemplified where the attaching portion 114 is part of the base 110, but the present invention is not limited to this, and a configuration is also possible in which the attaching portion 114 is a member separate from the base 110 and is bolted thereto.

The attaching portion 114 is a backrest that supports the back side (facing away from the arm 120) of a block 150. The base 110 has a vertical hole 116 (extending in the direction orthogonal to the rotation direction of the protrusion 122) and the stopper 140 is inserted into the hole 116. The hole 116 is located on the arm 120 side of the attaching portion 114, and about a half of the hole 116 forms a bore in the attaching portion 114, and the remaining part of the hole 116 juts out from the attaching portion 114 toward the arm 120.

The stopper 140 is constituted by a block 150 made of an elastic resin, and a metal surface plate 160 having a bent cross section. The metal surface plate 160 is arranged on the surface of the block 150 along the front side (that is, the arm 120 side) on which the stopper 140 comes into contact with the protrusion 122. The metal surface plate 160 does not cover the back surface of the block 150, and is not interposed between the block 150 and the attaching portion 114.

The block 150 is, for example, polygonal and columnar in the shape of a substantially triangular prism. The front side of the block 150 protrudes when viewed in a plan view in the direction in which the block 150 is inserted into the hole 116, and the entire stopper 140 including the block 150 and the metal surface plate 160 attached thereto is also polygonal and columnar. Also, the outer shape of the hole 116 conforms to the shape of the stopper 140. With this, even if the protrusion 122 comes into contact with the stopper 140, and the stopper 140 is subjected to a moment force in the rotational direction generated when a shear load is applied from the protrusion 122, it is possible to appropriately prevent rotation of the stopper 140 that is caused by a moment force generated by deformation of the metal surface plate 160 and the block 150. Note that the present embodiment describes an example in which the block 150 has the shape of a substantially triangular prism (hexagonal prism obtained by chamfering the corners of a triangular prism, when observed in detail). However, the present invention is not limited to this, and the block 150 may also be a polygonal prism other than a triangular prism.

Also, as shown in FIG. 2, according to the present embodiment, the stopper structure 100a includes a retaining plate 170 that biases (e.g. applies a spring force to) the stopper 140 to prevent the stopper 140 from being removed from the hole 116. The retaining plate 170 is attached to the attaching portion 114 by screws 180 after the insertion of the stopper 140 into the hole 116 of the robot 100 as shown in FIG. 4.

Figure 5A:
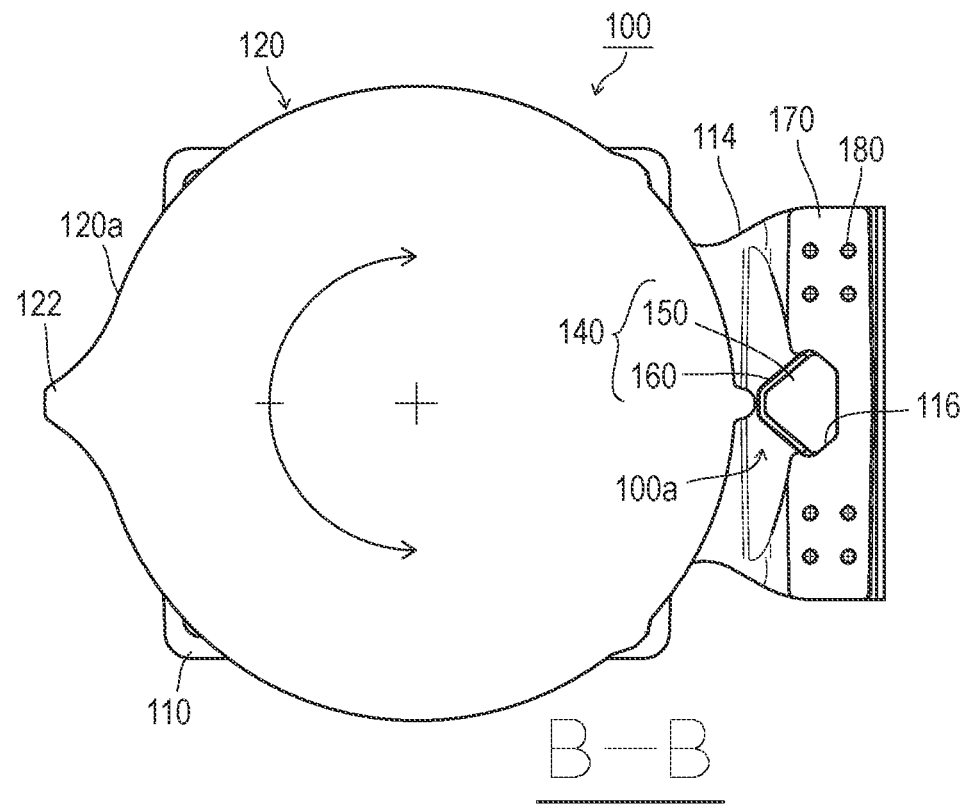
FIG. 5A and FIG. 5B show cross-sectional views taken along line B-B in FIG. 3B.
Figure 5B:
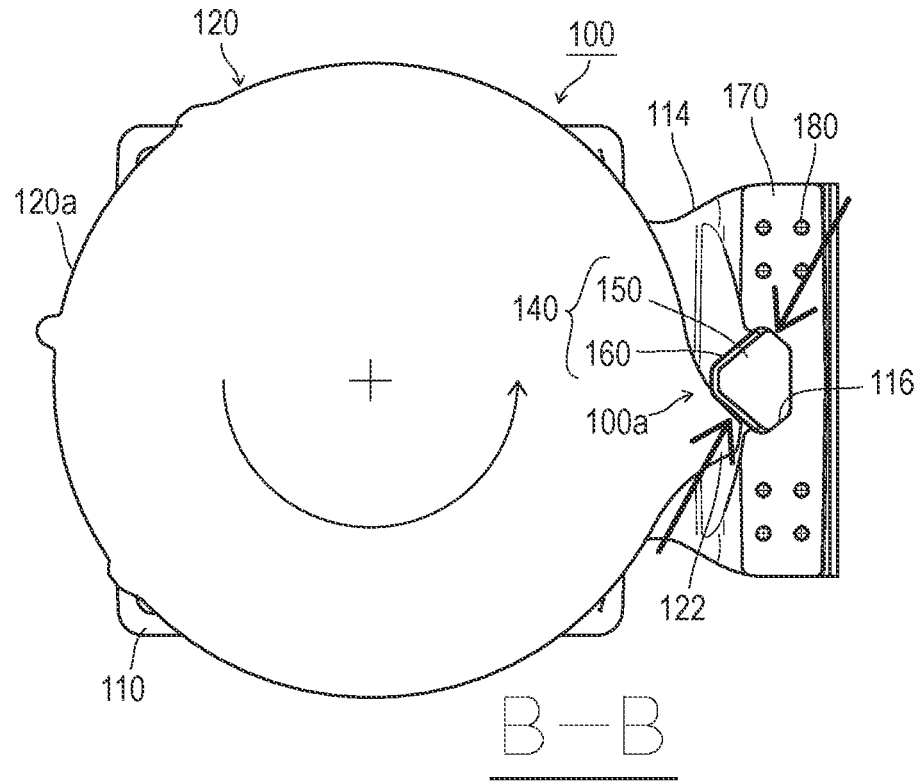

FIGS. 5A and 5B show cross-sectional views taken along the line B-B in FIG. 3B. FIG. 5A shows a case where the protrusion 122 shown in FIG. 1 is located at a position (default position) opposite to the stopper 140. FIG. 5B shows a case where the protrusion 122 shown in FIG. 1 is located at a position (restriction position) on the stopper 140 side. In the robot 100 of the present embodiment, the arm 120 is rotatable by up to a predetermined angle shown in FIG. 5A, and is restricted from rotating by more than the predetermined angle by the protrusion 122 coming into contact with the stopper 140 as shown in FIG. 5B.

Specifically, when the arm 120 is about to rotate by more than the predetermined angle, and the protrusion 122 comes into contact with the stopper 140, the protrusion 122 applies, upon contact, a load in a tangential direction of the circle of rotation (the outer circumference 120a of the arm 120). Accordingly, the load in a shear direction (a force in a direction of shifting an object in a parallel fashion, hereinafter, referred to as "shear load") acts on the stopper 140 with which the protrusion 122 has come into contact.

Here, according to the present embodiment, due to the configuration of the stopper 140 in which the metal surface plate 160 is arranged on the front side of the block 150 on which the stopper 140 comes into contact with the protrusion 122, when the shear load is applied to the stopper 140, the metal surface plate 160 elastically or plastically deforms, and thus the stopper 140 can absorb the impact. Also, due to being arranged inside the metal surface plate 160, the block 150 also deforms together with the plastic deformation of the metal surface plate 160, and thus it is possible to more efficiently absorb the shear load applied upon the contact. That is to say, the motion energy of the arm 120 is absorbed by the energy of the plastic deformation of the metal surface plate 160 and the energy of the elastic deformation of the block 150.

If the stopper 140 is constituted only by the elastic resin block 150 without any metal surface plate 160, the block 150 will be broken and damaged by the shear load, and the stopper 140 cannot absorb the impact of the contact. Also, if a stopper made only of an elastic resin is used, the stopper needs to have an increased thickness and an increased width in order to achieve high impact-absorbing performance. In contrast, according to the robot 100 of the present embodiment, the stopper 140 constituted by the block 150 and the metal surface plate 160 has high load-absorbing performance, and it is thus possible to realize the stopper 140 having a volume smaller than that of a stopper made only of an elastic resin. Accordingly, it is possible to arrange the stopper 140 even at an axis at which the arm 120 has a large operation range, without any space restrictions.

Also, since, with the above-described configuration, high impact-absorbing performance is realized, it is possible to sufficiently absorb impact at an axis such as a J1 axis at which the arm has a large operation range, namely, an operating angle exceeding 340 degrees. Therefore, an articulated robot no longer needs to decelerate to protect the stopper member, and can realize high-speed operation.

While preferred embodiments of the present invention have been described with reference to the attached drawings, it goes without saying that the present invention is not limited to the examples according to the present invention. A person skilled in the art will appreciate that various modifications and alterations can be made within the scope of the claims, and that all such modifications and alterations are also naturally encompassed in the technical scope of the present invention.

The present invention can be used as a stopper structure for restricting relative rotation between an arm and a mechanical element by a predetermined angle or more, and an articulated robot including such a stopper structure.

What is claimed is:

1. A stopper structure for restricting relative rotation between an arm and a mechanical element by a predetermined angle or more, the stopper structure comprising:
   a protrusion provided on one of the arm and the mechanical element;
   a hole formed in the other one of the arm and the mechanical element;
   a stopper inserted into the hole while being partially exposed from the hole; and
   a retaining plate that biases the stopper to prevent the stopper from being removed from the hole,
   wherein the stopper includes:
      a block made of an elastic resin; and
      a metal surface plate that has a bent cross-section, and is provided on a surface of the block along a front side on which the stopper comes into contact with the protrusion.

2. A stopper structure for restricting relative rotation between an arm and a mechanical element by a predetermined angle or more, the stopper structure comprising:
   a protrusion provided on one of the arm and the mechanical element;
   a hole formed in the other one of the arm and the mechanical element;
   a stopper inserted into the hole while being partially exposed from the hole; and
   a retaining plate that biases the stopper to prevent the stopper from being removed from the hole,
   wherein the stopper includes:
      a polygonal prism block made of an elastic resin; and
      a metal surface plate that has a bent cross-section, and is provided on a surface of the block along a front side on which the stopper comes into contact with the protrusion.

3. The stopper structure according to claim 1,
   wherein the mechanical element is a base or another arm of an articulated robot.

4. The stopper structure according to claim 2,
   wherein the mechanical element is a base or another arm of an articulated robot.

5. An articulated robot comprising:
   a stopper structure for restricting relative rotation between an arm and a mechanical element by a predetermined angle or more;
   a protrusion provided on one of the arm and the mechanical element;
   a hole formed in the other one of the arm and the mechanical element;
   a stopper inserted into the hole while being partially exposed from the hole; and
   a retaining plate that biases the stopper to prevent the stopper from being removed from the hole,
   wherein the stopper includes:
      a block made of an elastic resin; and
      a metal surface plate that has a bent cross-section, and is provided on a surface of the block along a front side on which the stopper comes into contact with the protrusion.

6. An articulated robot comprising:
   a stopper structure for restricting relative rotation between an arm and a mechanical element by a predetermined angle or more;
   a protrusion provided on one of the arm and the mechanical element;
   a hole formed in the other one of the arm and the mechanical element;

a stopper inserted into the hole while being partially exposed from the hole; and a retaining plate that biases the stopper to prevent the stopper from being removed from the hole, wherein the stopper includes:

a polygonal prism block made of an elastic resin; and a metal surface plate that has a bent cross-section, and is provided on a surface of the block along a front side on which the stopper comes into contact with the protrusion.

* * * * *